(12) United States Patent
Jiang et al.

(10) Patent No.: US 9,795,942 B2
(45) Date of Patent: Oct. 24, 2017

(54) MEDIUM MATERIAL AND ITS PREPARATION METHOD FOR ELIMINATION OF ARSENIC POLLUTION FROM GROUNDWATER

(71) Applicant: Chinese Research Academy of Environmental Sciences, Beijing (CN)

(72) Inventors: Yonghai Jiang, Beijing (CN); Beidou Xi, Beijing (CN); Yu Yang, Beijing (CN); Mingxiao Li, Beijing (CN); Zhifei Ma, Beijing (CN); Xinying Lian, Beijing (CN); Xiangjian Xu, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 138 days.

(21) Appl. No.: 14/955,995

(22) Filed: Dec. 1, 2015

(65) Prior Publication Data
US 2016/0332137 A1    Nov. 17, 2016

(30) Foreign Application Priority Data

May 15, 2015  (CN) .......................... 2015 1 0247526

(51) Int. Cl.
*B01J 20/22* (2006.01)
*B01J 20/30* (2006.01)
*C02F 1/28* (2006.01)
*C02F 1/72* (2006.01)
*C02F 101/10* (2006.01)

(52) U.S. Cl.
CPC ........... *B01J 20/22* (2013.01); *B01J 20/3021* (2013.01); *B01J 20/3028* (2013.01); *B01J 20/3078* (2013.01); *C02F 1/28* (2013.01); *C02F 1/72* (2013.01); *C02F 2101/103* (2013.01)

(58) Field of Classification Search
None
See application file for complete search history.

(56) References Cited

U.S. PATENT DOCUMENTS

| 7,182,872 B2* | 2/2007 | Barak | B01D 61/24 119/173 |
| 2004/0185661 A1* | 9/2004 | Sherer | B01D 53/02 438/689 |
| 2005/0023220 A1* | 2/2005 | Barak | B01D 61/24 210/639 |
| 2006/0217585 A1* | 9/2006 | Forrester | A62D 3/33 588/256 |
| 2007/0219403 A1* | 9/2007 | Palasram | A62D 3/33 588/252 |
| 2012/0164041 A1* | 6/2012 | Smith | C01G 28/02 423/87 |
| 2014/0246326 A1* | 9/2014 | Gieron | C25C 1/12 205/148 |
| 2014/0356261 A1* | 12/2014 | Choi | C22B 30/04 423/87 |
| 2016/0159670 A1* | 6/2016 | Foster | C02F 11/06 210/758 |

* cited by examiner

*Primary Examiner* — Joseph D Anthony
(74) *Attorney, Agent, or Firm* — Baker & Hostetler LLP

(57) ABSTRACT

The present invention relates to a medium material for eliminating arsenic pollution from groundwater, which is a granular material having an average particle diameter of 1 to 3 cm, prepared from manganese ore, meerschaum, straws, animal excrements, active sludge and active bacterium agent in a mass ratio of 1:0.2~0.5:0.5~1:0.2~0.4:0.2~0.4: 0.0005~0.002 via mixing, composting, carbonizing and crushing. The prevent invention also discloses a process for producing the above-mentioned medium material. The medium material of the present invention can eliminate multivalent arsenic from groundwater, has a long service life, and does not cause secondary pollution to groundwater.

7 Claims, No Drawings

MEDIUM MATERIAL AND ITS PREPARATION METHOD FOR ELIMINATION OF ARSENIC POLLUTION FROM GROUNDWATER

CROSS REFERENCE TO RELATED APPLICATIONS

This document claims priority to Chinese Patent Application Number 201510247526.4 filed May 15, 2015, the entire contents of which are hereby incorporated by reference.

TECHNICAL FIELD OF THE INVENTION

The present invention belongs to the groundwater pollution remediation in the field of environmental protection, and in particular, relates to a medium material for eliminating arsenic pollution from groundwater.

The present invention also relates to a process for producing the medium material mentioned above.

BACKGROUND OF THE INVENTION

Arsenic is a primary pollutant in groundwater. In recent years, due to the development of industries, a large amount of waste water discharged from industries, such as mining, coal burning, paper-making and pigment, causes the content of arsenic in groundwater to increase drastically, affecting human health and safety of the ecology environment severely. Arsenic in the groundwater environment is mainly present in forms of inorganic arsenic As(III) and As(V), and the former has a great toxicity, which is about 60-fold higher than that of the latter.

In various technologies for remediating groundwater, the selection of medium materials directly affects the elimination effect of pollutants, and is the key for whether the remediation effect is good or not. Currently, medium materials for eliminating arsenic mainly include active carbon, zero valent iron, bentonite, zeolite, or the like. However, these materials generally subject to disadvantages, such as poor remediation effect, short service life. In particular, for multivalent arsenic, these materials exhibit low elimination rate for As(III), so that a preoxidation treatment is often necessary. Thus, it is urgent to develop an efficient, cheap medium material that can eliminate As(III) and As(V) from groundwater simultaneously.

SUMMARY OF THE INVENTION

An object of the present invention is to provide a medium material for eliminating arsenic pollution from groundwater.

Another object of the present invention is to provide a process for producing the above-mentioned medium material.

In order to accomplish the above-mentioned objects, the medium material provided by the present invention is a granular material having an average particle diameter of 1 to 3 cm, prepared from manganese ore, meerschaum, straws, animal excrements, active sludge and active bacterium agents in a mass ratio of 1:0.2~0.5:0.5~1:0.2~0.4:0.2~0.4: 0.0005~0.002 via mixing, composting, carbonizing and crushing.

In the medium material, the manganese ore is psilomelane having an average particle diameter of 0.5 to 4 cm; the meerschaum has an average particle diameter of 0.5 to 3 cm; the straw is corn straws having a length of 2 to 5 cm; the animal excrement is crushed excrements of flocks and herds, having a moisture content less than 40%; the active sludge is taken from residual sludge in the sedimentation tanks of sewage treatment plants, having a sludge index between 100 and 150; and the active bacterium agent is a mixture of liquid manganese-oxidizing bacteria and lignocelluloses-degrading bacteria in a mass ratio of 2~4:1.

The process for producing the above-mentioned medium material according to the present invention comprises the following main steps:

1) mixing manganese ore, meerschaum, straws, animal excrements and active sludge in a mass ratio of 1:0.2~0.5: 0.5~1:0.2~0.4:0.2~0.4 uniformly, during which an active bacterium agent prepared is added continuously, wherein the mass ratio of the active bacterium agent to the manganese ore is 0.0005~0.002:1;

2) placing the resultant mixture into a composting reactor to compost it in a good composting environment ensured by aperiodic turning the compost and sprinkling water;

3) after completion of the composting, placing the composted product into a dry-distillation pot to perform dry-distilling carbonization with the final temperature of the dry-distilling carbonization controlled at 370 to 400° C., and then cooling to obtain a carbonized product;

4) crushing and granulating the carbonized product into granules having an average particle diameter of 1 to 3 cm, as the desired product.

In the process, the manganese ore is psilomelane having an average particle diameter of 0.5 to 4 cm; the meerschaum has an average particle diameter of 0.5 to 3 cm; the straw is corn straws having a length of 2 to 5 cm; the animal excrement is crushed excrements of flocks and herds, having a moisture content less than 40%; the active sludge is taken from residual sludge in the sedimentation tanks of sewage treatment plants, having a sludge index between 100 and 150; and the active bacterium agent is a mixture of liquid manganese-oxidizing bacteria and lignocelluloses-degrading bacteria in a mass ratio of 2~4:1.

In the process, the compost is turned once every 3 to 4 days in the first ⅓ of the composting period, once every 7 days in the middle ⅓ of the composting period, and once every 12 days in the last ⅓ of the composting period.

In the process, water is sprinkled to the raw materials for composting at the time when turning the compost, so as to keep the moisture content always at 60%.

The medium material of the present invention has the following several advantages:

1. The medium material of the present invention, upon the composting treatment, has a relatively high oxidation activity, which can oxidize As(III) of a high toxicity into As(V) of a low toxicity in an oxidation rate of 95% or more.

2. The medium material of the present invention has irregular space structures, which allows it to possess a higher adsorption activity and facilitates arsenic to embed into the space structures.

3. The medium material of the present invention is safe and environment friendly, has a long service life, and does not cause secondary pollution to groundwater.

EMBODIMENTS OF THE INVENTION

The medium material of the present invention is prepared from manganese ore, meerschaum, straws, animal excrements, active sludge and active bacterium agent via mixing, composting, carbonizing and crushing, and can eliminate arsenic from groundwater efficiently.

The medium material of the present invention is granular, and is a granular material having an average particle diameter of 1 to 3 cm, which is prepared from manganese ore, meerschaum, straws, animal excrements, active sludge and active bacterium agent in a certain proportion via mixing, composting, carbonizing and crushing. Herein, the manganese ore is psilomelane having an average particle diameter of 0.5 to 4 cm, the meerschaum has an average particle diameter of 0.5 to 3 cm, the straw is corn straws having a length of 2 to 5 cm, the animal excrement is crushed excrements of flocks and herds, having a moisture content less than 40%; the active sludge is taken from residual sludge in the sedimentation tanks of sewage treatment plants (with a SVI between 100 and 150); and the active bacterium agent is a mixture of liquid manganese-oxidizing bacteria and lignocelluloses-degrading bacteria in a mass ratio of 2~4:1. The manganese ore, meerschaum, straws, animal excrements and active sludge are sufficiently mixed in a mass ratio of 1:0.2~0.5:0.5~1:0.2~0.4:0.2~0.4, during which an active bacterium agent is added continuously, wherein the mass ratio of the active bacterium agent to the manganese ore is 0.0005~0.002:1. The resultant mixture is placed into a composting reactor to compost for 30 to 40 weeks. A good composting environment is ensured by aperiodic turning the compost and sprinkling water, wherein the compost is turned once every 3 to 4 days in the first ⅓ of the composting period, once every 7 days in the middle ⅓ of the composting period, and once every 12 days in the last ⅓ of the composting period. Water is sprinkled at the time when turning the compost, so as to keep the moisture content of the raw materials for composting always at 60%. After completion of the composting, the compost product is placed into a dry-distilling pot to perform dry-distilling carbonization with the final temperature for carbonization controlled at 370 to 400° C., the total duration for carbonization is 6 to 12 h. After cooling, the dry-distilled product is crushed and granulated, so that finally a medium material having an average particle diameter of 1 to 3 cm is obtained.

EXAMPLE 1

2 kg of psilomelane granules (0.5 to 2 cm), 400 g of meerschaum (0.5 to 2 cm), 1.5 kg of corn straws having a length of 3 cm, 350 g of cattle excrements, and 400 g of active sludge were mixed sufficiently, during which an active bacterium agent formulated by 20 g of liquid manganese-oxidizing bacteria and 5 g of liquid lignocelluloses-degrading bacteria was added continuously. After mixing uniformly, the mixture was placed into a composting reactor to compost it for 30 weeks. The compost was turned once every 4 days in the first 10 weeks, once every 7 days in the 11 to 20 weeks, and once every 12 days in the last 10 weeks. Water was sprinkled at the time when turning of the compost, so as to keep the moisture content of the raw materials for composting always at about 60%. After completion of the composting, the composted product was placed into a dry-distilling pot to perform dry-distilling carbonization, wherein the final temperature for carbonization was controlled at about 380° C., and the total duration for carbonization was 8 h. After cooling, the dry-distilled product was crushed and granulated to obtain a medium material having an average particle diameter of 1 to 3 cm.

50 kg of the resultant medium material was used as the active medium material for a permeable reactive barrier, so as to remediate groundwater polluted by arsenic (As(III) concentration: 0.3 mg/L, and As(V) concentration: 0.2 mg/L). During the two months operated by the permeable reactive barrier, the arsenic contents of two forms in the solid and liquid phase were detected and analyzed. As the results, the oxidation rate of the medium material to As(III) was 95.4%, and the adsorption rate to the total As was kept between 96.1 to 97.2%.

EXAMPLE 2

5 kg of psilomelane granules (0.5 to 1 cm), 2 kg of meerschaum (1 to 3 cm), 2.5 kg of corn straws having a length of 4 cm, 1.5 kg of cattle excrements, and 1.2 kg of active sludge were mixed sufficiently, during which an active bacterium agent formulated by 60 g of liquid manganese-oxidizing bacteria and 15 g of liquid lignocelluloses-degrading bacteria were added continuously. After mixing uniformly, the mixture was placed into a composting reactor to compost it for 36 weeks. The compost was turned once every 4 days in the first 12 weeks, once every 7 days in the 13 to 24 weeks, and once every 12 days in the last 12 weeks. Water was sprinkled at the time when turning of the compost, so as to keep the moisture content of the raw materials for composting always at about 60%. After completion of the composting, the composted product was placed into a dry-distilling pot to perform dry-distilling carbonization, wherein the final temperature for carbonization was controlled at about 390° C., and the total duration for carbonization was 7 h. After cooling, the dry-distilled product was crushed and granulated to obtain a medium material having an average particle diameter of 1 to 3 cm.

50 kg of the resultant medium material was used as the active medium material for a permeable reactive barrier, so as to remediate groundwater polluted by arsenic (As(III) concentration: 0.5 mg/L, and As(V) concentration: 0.5 mg/L). During the two months operated by the permeable reactive barrier, the arsenic contents of two forms in the solid and liquid phase were detected and analyzed. As the results, the oxidation rate of the medium material to As(III) was 96.9%, and the adsorption rate to total As was kept between 96.4 to 97.8%.

What is claimed is:

1. A medium material for eliminating arsenic pollution from groundwater, which is a granular material having an average particle diameter of 1 to 3 cm, prepared from manganese ore, meerschaum, straws, animal excrements, active sludge and active bacterium agent in a mass ratio of 1:0.2~0.5:0.5~1:0.2~0.4:0.2~0.4:0.0005~0.002 via mixing, composting, carbonizing and crushing.

2. The medium material according to claim 1, wherein
the manganese ore is psilomelane having an average particle diameter of 0.5 to 4 cm;
the meerschaum has an average particle diameter of 0.5 to 3 cm;
the straw is corn straws having a length of 2 to 5 cm;
the animal excrement is crushed excrements of flocks and herds having a moisture content less than 40%;
the active bacterium agent is a mixture of liquid manganese-oxidizing bacteria and lignocelluloses-degrading bacteria in a mass ratio of 2~4:1; and
the active sludge is taken from residual sludge in a sedimentation tank of sewage treatment plants, and has a sludge index between 100 and 150.

3. A process for producing the medium material according to claim 1, comprising the following main steps of:
1) mixing manganese ore, meerschaum, straws, animal excrements and active sludge in a mass ratio of 1:0.2~0.5:0.5~1:0.2~0.4:0.2~0.4 uniformly, during which an active bacterium agent is added continuously, wherein the mass ratio of the active bacterium agent to the manganese ore is 0.0005~0.002:1;

2) placing the resultant mixture into a composting reactor to compost it in a good composting environment ensured by aperiodic turning the compost and sprinkling water;

3) after completion of the composting, placing the composted product into a dry-distilling pot to perform dry-distilling carbonization, wherein the final temperature of the dry distillation and carbonization is controlled at 370 to 400° C., and then cooling to obtain a carbonized product;

4) crushing and granulating the carbonized product into granules having an average particle diameter of 1 to 3 cm, as the desired product.

4. The process according to claim 3, wherein the manganese ore is psilomelane having an average particle diameter of 0.5 to 4 cm;

the meerschaum has an average particle diameter of 0.5 to 3 cm;

the straw is corn straws having a length of 2 to 5 cm;

the animal excrement is crushed excrements of flocks and herds having a moisture content less than 40%;

the active sludge is taken from residual sludge in a sedimentation tank of sewage treatment plants, and has a sludge index between 100 and 150; and the active bacterium agent is a mixture of liquid manganese-oxidizing bacteria and lignocelluloses-degrading bacteria in a mass ratio of 2~4:1.

5. The process according to claim 3, wherein the compost is turned once every 3 to 4 days in the first ⅓ of the composting period, once every 7 days in the middle ⅓ of the composting period, and once every 12 days in the last ⅓ of the composting period.

6. The process according to claim 3, wherein water is sprinkled to the raw materials for composting at the time when turning the compost, so as to keep the moisture content always at 60%.

7. The process according to claim 5, wherein water is sprinkled to the raw materials for composting at the time when turning the compost, so as to keep the moisture content always at 60%.

* * * * *